United States Patent
Shen et al.

(10) Patent No.: US 10,342,317 B2
(45) Date of Patent: Jul. 9, 2019

(54) EYEBROW SHAPE GUIDE DEVICE AND METHOD THEREOF

(71) Applicant: CAL-COMP BIG DATA, INC., New Taipei (TW)

(72) Inventors: Shyh-Yong Shen, New Taipei (TW); Min-Chang Chi, New Taipei (TW); Cheng-Hsuan Tsai, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 133 days.

(21) Appl. No.: 15/638,396

(22) Filed: Jun. 30, 2017

(65) Prior Publication Data

US 2018/0332950 A1 Nov. 22, 2018

(30) Foreign Application Priority Data

May 16, 2017 (CN) .......................... 2017 1 0342816

(51) Int. Cl.
*G06K 9/00* (2006.01)
*A45D 44/22* (2006.01)

(52) U.S. Cl.
CPC ......... *A45D 44/22* (2013.01); *G06K 9/00228* (2013.01); *G06K 9/00281* (2013.01); *G06K 9/00671* (2013.01)

(58) Field of Classification Search
CPC ............... A45D 44/22; G06K 9/00228; G06K 9/00281; G06K 9/00671
See application file for complete search history.

(56) References Cited

U.S. PATENT DOCUMENTS

| | | |
|---|---|---|
| 9,204,702 B2 | 12/2015 | Soare |
| 2015/0262403 A1 | 9/2015 | Yamanashi |
| 2017/0169285 A1* | 6/2017 | Chen ................. G06K 9/00268 |

OTHER PUBLICATIONS

"Search Report of Europe Counterpart Application", dated Feb. 28, 2018, p. 1-p. 7, in which the listed references were cited.

* cited by examiner

*Primary Examiner* — Siamak Harandi
(74) *Attorney, Agent, or Firm* — JCIPRNET

(57) ABSTRACT

An eyebrow shape guide device and a method thereof are provided. The eyebrow shape guide device includes an image capturing unit, a processor and a display unit. The image capturing unit captures a face image of a user. The processor acquires at least one nose feature point, at least one eye feature point and at least one eyebrow feature point according to the face image, and performs calculation according to the feature points to obtain an eyebrow guide block. The display unit displays the face image and the corresponding eyebrow guide block, and guides the user to put on makeup according to the eyebrow guide block.

7 Claims, 3 Drawing Sheets

EYEBROW SHAPE GUIDE DEVICE AND METHOD THEREOF

CROSS-REFERENCE TO RELATED APPLICATION

This application claims the priority benefit of Chinese application serial no. 201710342816.6, filed on May 16, 2017. The entirety of the above-mentioned patent application is hereby incorporated by reference herein and made a part of this specification.

BACKGROUND OF THE DISCLOSURE

Field of the Disclosure

The disclosure relates to a facial feature recognition technique, and particularly relates to an eyebrow shape guide device based on recognition of various parts of a face and a method thereof.

Description of Related Art

The love of beauty is woman's nature, and many women will add facial features through makeup, for example, to put on makeup on lips, eyes, eyebrows, etc. to adjust appearances thereof. However, the skill of makeup is not innate, and a makeup effect can be improved after a number of cosmetic practises.

If someone wants to learn a makeup kill, the learner may learn it from images on the Internet. However, the makeup skill learned through images and/or videos may have a deviation in practice. Therefore, how to learn the makeup skill through modern equipment is a technical issue concerned by manufacturers.

SUMMARY OF THE DISCLOSURE

The disclosure is directed to an eyebrow shape guide device and an eyebrow shape guide method, where a better eyebrow shape guide block is presented according to a face image of a user, such that the user is able to shape eyebrows or put on makeup on the eyebrows according to a prompt provided by the eyebrow shape guide device, so as to provide convenient interactive makeup teaching.

The disclosure provides an eyebrow shape guide device including an image capturing unit, a processor and a display unit. The image capturing unit captures a face image of a user, where the face image at least includes a nose portion, an eye portion and an eyebrow portion of the user. The processor receives the face image, and acquires at least one nose feature point, at least one eye feature point and at least one eyebrow feature point according to the face image, and the processor performs calculation according to the at least one nose feature point, the at least one eye feature point and the at least one eyebrow feature point to obtain an eyebrow guide block. The display unit displays the face image and the corresponding eyebrow guide block, and guides the user to put on makeup according to the eyebrow guide block.

The disclosure provides an eyebrow shape guide method including following steps. A face image of a user is captured, where the face image at least includes a nose portion, an eye portion and an eyebrow portion of the user. At least one nose feature point, at least one eye feature point and at least one eyebrow feature point are acquired according to the face image, and calculation is performed according to the at least one nose feature point, the at least one eye feature point and the at least one eyebrow feature point to obtain an eyebrow guide block. The face image and the corresponding eyebrow guide block are displayed to guide the user to put on makeup according to the eyebrow guide block.

According to the above description, the eyebrow shape guide device and the eyebrow shape guide method of the disclosure calculate and display the eyebrow guide block according to positions of the nose, the eyes and the eyebrows in the face image of the user, such that the user learns a region of the eyebrow required to be shaped or emphasized, so as to accurately adjust the eyebrow shape. In this way, even the user is not familiar with the makeup, the user may still shape the eyebrows or put on makeup on the eyebrows according to the prompt provided by the eyebrow shape guide device, so as to provide convenient interactive makeup teaching.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
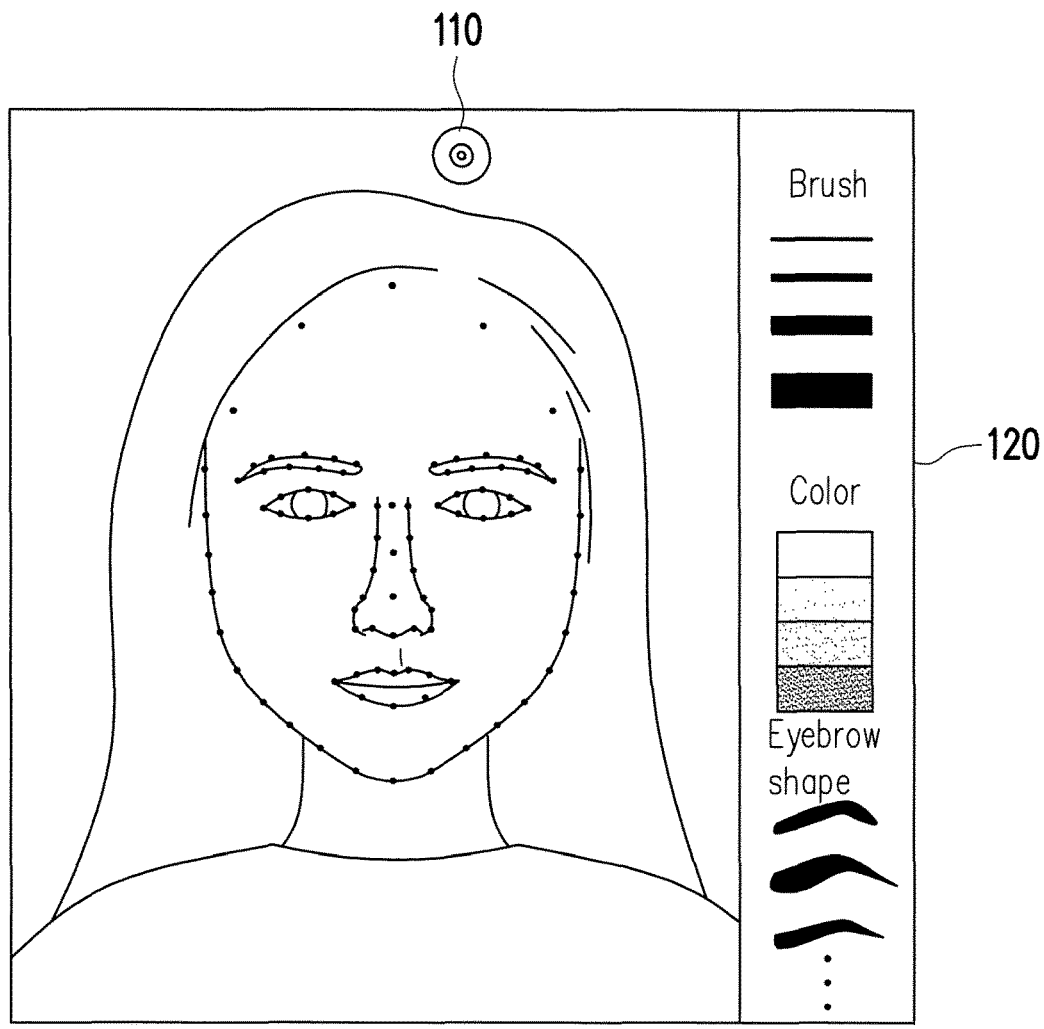
FIG. 1 is a schematic diagram of a display interface of an eyebrow shape guide device according to an embodiment of the disclosure.
Figure 2:
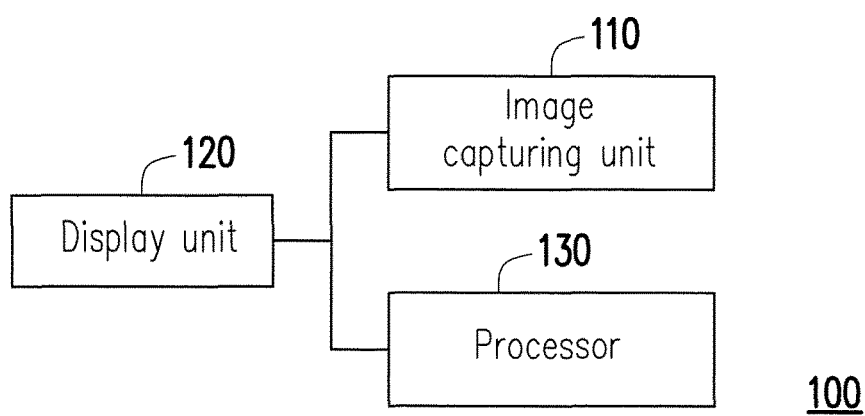
FIG. 2 is a system block diagram of an eyebrow shape guide device according to an embodiment of the disclosure.

FIG. 1 is a schematic diagram of a display interface of an eyebrow shape guide device according to an embodiment of the disclosure, and FIG. 2 is a system block diagram of an eyebrow shape guide device according to an embodiment of the disclosure. Referring to FIG. 1 and FIG. 2, in the present exemplary embodiment, the eyebrow shape guide device 100 includes an image capturing unit 110, a multimedia display unit 120 and a processor 130.

The image capturing unit 110 is used for capturing a face image of a user. In the present embodiment, an ideal position of an eyebrow shape is calculated according to positions of a nose portion, an eye portion and an eyebrow portion in the face image of the user, so that the face image of the user requires to include the nose portion, the eye portion and the eyebrow portion of a left half face or a right half face, so as to calculate a preferred relative position of the left side eyebrow or the right side eyebrow. The image capturing unit 110 is, for example, an embedded video camera, a camera, or a mobile phone, a camera, etc. connected in an external manner, which is not limited by the disclosure.

The display unit 120 may display multimedia information and the face image of the user in real-time. For example, the display unit 120 displays the face image of the user and provides options of a plurality of eyebrow shapes and eyebrow colors for the user to select. In the present exemplary embodiment, the display unit 120 can be a display disposed behind a material with a high reflectivity (for example, a mirror) and combined with organic light-emitting diodes (OLED). In this way, the user may view her own face through the mirror, and the display unit 120 may display related information on the mirror for the user to view and for touch selection, though the disclosure is not limited thereto. The eyebrow shape guide device 100 of the present embodiment can be a device disposed on a makeup table, and a screen of the eyebrow shape guide device 100 can be disposed behind the mirror, and a text or an image displayed thereon may pass through the mirror for the user to view. In other embodiments, the eyebrow shape guide device 100 can also be a consumable electronic product such as a smart phone, a tablet PC, etc., or a portable mirror box combined with a portable mirror.

The processor 130 performs a calculation according to the face image of the user captured by the image capturing unit 110, so as to obtain a plurality of face feature points of the user related to the face of the user, for example, at least one nose feature point, at least one eye feature point and at least eyebrow feature point. Moreover, the processor 130 performs calculation according to the aforementioned feature points to obtain an eyebrow guide block, and displays the face image of the user and the eyebrow guide block through the display unit 120, so as to guide the user to put on makeup according to the eyebrow guide block. For example, in an implementation of the present exemplary embodiment, the processor 130 can be a central processing unit (CPU), a microprocessor, an application specific integrated circuits (ASIC), a programmable logic device (PLD) or other similar devices. The processor 130 is configured to run various necessary software programs and/or instruction sets for providing eyebrow guide blocks. In the present exemplary embodiment, the processor 130 runs a face detection system using a Dlib face landmark to detect and analyze 194 face feature points of the user's face. These face feature points respectively represent various portions of the user face, for example, eyes, eyebrows, a nose, lips, a chin contour, etc. In other cases, the face feature points of the user can be acquired by only analyzing 119 face feature points of the user's face or using other face feature point algorithms for detecting the face feature points of the user.

In the present embodiment, when the user faces the mirror to put on a makeup, the display unit 120 may display the face image of the user, and analyze the face feature points in the face image in real-time. In order to provide convenience to interact with the eyebrow shape guide device, in the disclosure, the eyebrow guide block used for guiding the makeup is further calculated based on positions of nosewings located at two sides of the user's nose, the eyes and the eyebrows, etc., and the eyebrow guide block is displayed on the display unit 120 corresponding to the face image of the user, so as to prompt a position of the eyebrow required to be shaped or put on makeup to the user. Moreover, the user may adjust a thickness, a position, a shape of the eyebrow guide block through the display interface shown in FIG. 1, so as to cope with the requirements of the user. In this way, the user may shape the eyebrow, or put on makeup by using an eyebrow pencil or eyebrow powder on an actual position of the eyebrow of the user according to guidance of the eyebrow guide block displayed by the display unit 120. It should be noted that the eyebrow guide block is formed by dotted lines at an ideal eyebrow position calculated according to the positions of the nose, the eyes and eyebrow tips. However, the method for displaying the eyebrow guide block is not limited thereto. In other embodiments, the method for displaying the eyebrow guide block is to direct take the actual eyebrow of the user as a reference to adjust an eyebrow display block, and take the adjusted eyebrow display block as the eyebrow guide block.

Figure 3:
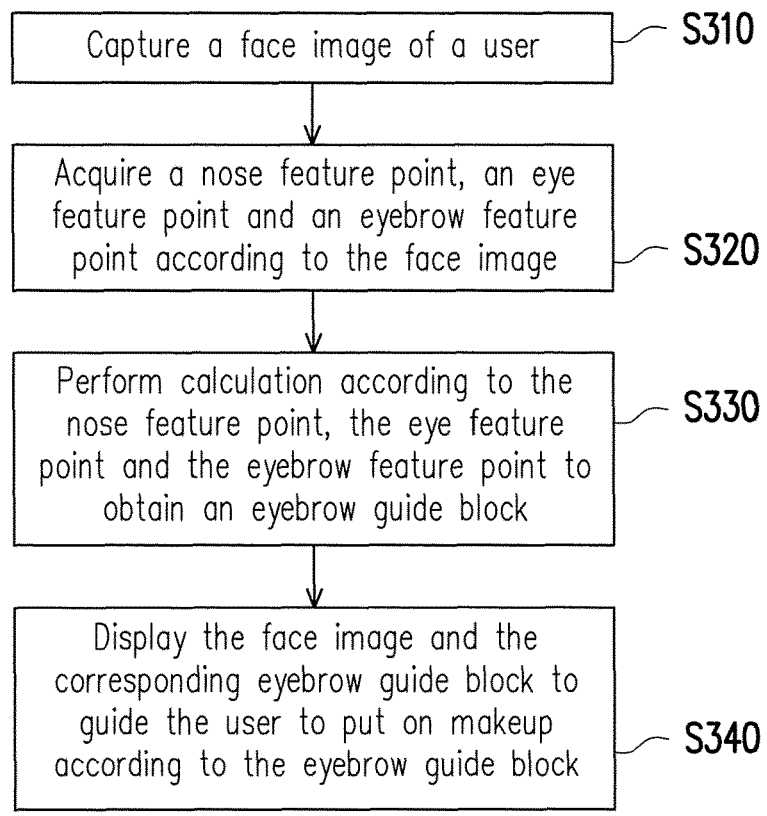
FIG. 3 is a flowchart illustrating an eyebrow shape guide method according to an embodiment of the disclosure.
Figure 4:
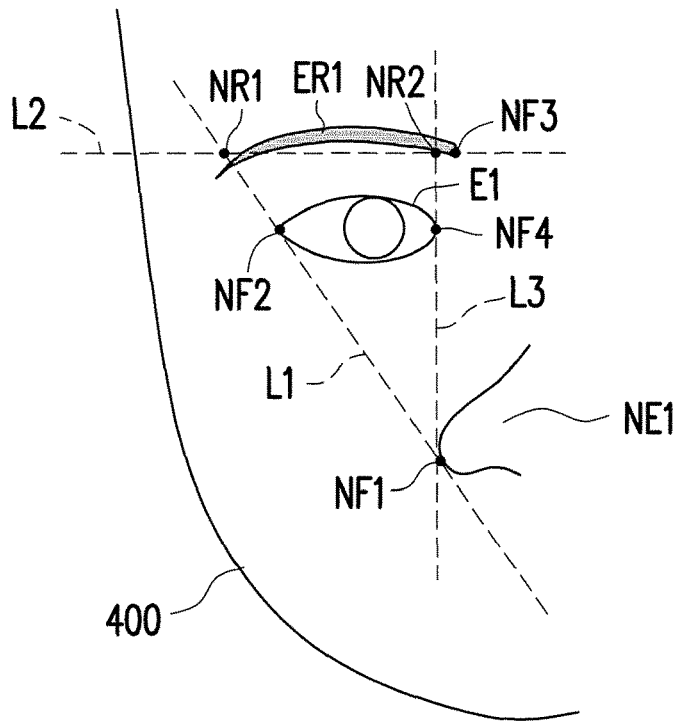
FIG. 4 is a schematic diagram of calculating a tip indication point and a tail indication point of an eyebrow guide block of the disclosure.
Figure 5:
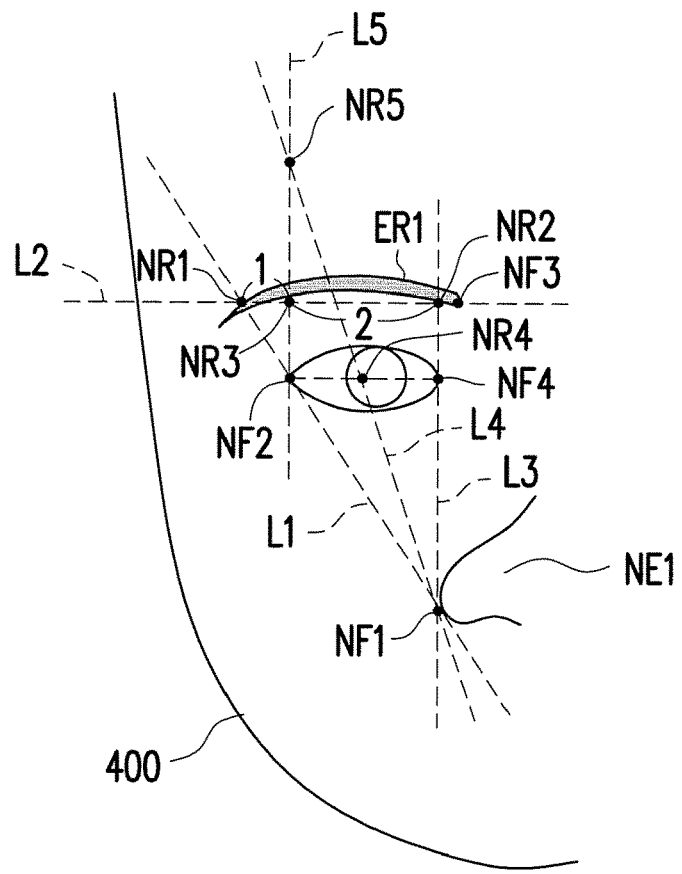
FIG. 5 is a schematic diagram of calculating a tip indication point, a tail indication point and a peak indication point of an eyebrow guide block of the disclosure.

FIG. 3 is a flowchart illustrating an eyebrow shape guide method according to an embodiment of the disclosure. FIG. 4 is a schematic diagram of calculating a tip indication point and a tail indication point of the eyebrow guide block of the disclosure. FIG. 5 is a schematic diagram of calculating a tip indication point, a tail indication point and a peak indication point of the eyebrow guide block of the disclosure.

Referring to FIG. 1 and FIG. 3, in step S310, the image capturing unit 110 first captures a face image of the user, where the face image at least includes a nose portion, an eye portion and an eyebrow portion of the user. In step S320, the processor 130 receives the face image from the image capturing unit 110, and acquires at least one nose feature point, at least one eye feature point and at least one eyebrow feature point according to the face image. In the present embodiment, the face image includes a first side face image (for example, a right side face image) and a second side face image (a left side face image), and the processor 130 may obtain the face image of one of the two sides through the image capturing unit 110 to calculate the corresponding eyebrow guide block.

In step S330, the processor 130 performs calculation according to the at least one nose feature point, the at least one eye feature point and the at least one eyebrow feature point obtained in the step S320 to obtain an eyebrow guide block. FIG. 4 is a schematic diagram corresponding to the step S330 of FIG. 5. Referring to FIG. 4, and taking the right side face image (the first side face image) of the user as an example, it should be noted that although FIG. 4 and FIG. 5 only illustrate the right side face image of the user to describe how to calculate the eyebrow guide block of the right side face image, those skilled in the art may deduce how to calculate the eyebrow guide block of the left side face image according to a similar manner.

In FIG. 4, the right side face image 400 includes a right eye (first eye) E1, a right eyebrow (first eyebrow) ER1 and a nose NE1. In the step S320, the processor 130 takes a first feature point NF1 corresponding to the nosewing close to the first eye E1 as one of the at least one nose feature points (for example, a $45^{th}$ face feature point in "Dlib Face Landmark"); takes a second feature point NF2 corresponding to the first eye E1 located the farthest away from one side of the nose NE1 as one of the at least one eye feature points (for example, a $144^{th}$ face feature point in "Dlib Face Landmark"); takes a fourth feature point NF4 corresponding to the first eye E1 located the closest to one side of the nose NE1 as one of the at least one eye feature points (for example, a $134^{th}$ face feature point in "Dlib Face Landmark"); and takes a third feature point NF3 corresponding to an eyebrow tip of the first eyebrow ER1 as one of the at least one eyebrow feature points (for example, a $174^{th}$ face feature point in "Dlib Face Landmark").

The processor 130 obtains a first reference point NR1 according to an intersection of a first extending line L1 passing through the first feature point NF1 (a nosewing endpoint of the nose NE1) and a second feature point NF2 (an endpoint of the first eye E1 located the farthest away from one side of the nose NE1) and a second horizontal line L2 of the third feature point NF3 (a tip endpoint of the first eyebrow ER1). The first reference point NR1 serves as a tail indication point of the eyebrow guide block.

The processor 130 obtains a second reference point NR2 according to an intersection of a third vertical line L3 of the first feature point NF1 (the nosewing endpoint of the nose NE1) and the second horizontal line L2 of the third feature point NF3 (the tip endpoint of the first eyebrow ER1). The second reference point NR2 serves as a tip indication point of the eyebrow guide block.

After the tip indication point and the tail indication point of the eyebrow guide block are obtained according to the above calculation method, a peak indication point of the eyebrow guide block is required to be found. Referring to FIG. 5, the processor 130 obtains a third reference point NR3 from a line segment between the first reference point NR1 (the tail indication point) and the second reference point NR2 (the tip indication point) according to a predetermined proportion. The predetermined proportion of the present embodiment is a proportion between a distance between the first reference point NR1 (the tail indication point) and the third reference point NR3 and a distance between the second reference point NR2 (the tip indication point) and the third reference point NR3, which is 1:2. Those skilled in the art may adjust the predetermined proportion according to an actual requirement, so as to adjust a relative position of the eyebrow peak. The processor 130 further obtains a fourth reference point NR4 (located in the middle of the first eye E1) according to the second feature point NF2 (an endpoint of the first eye E1 located the farthest away from one side of the nose NE1) and the fourth feature point NF4 (an endpoint of the first eye E1 located the closest to the one side of the nose NE1). In other words, a proportion between a distance between the second feature point NF2 and the fourth reference point NR4 and a distance between the fourth feature point NF4 and the fourth reference point NR4 is 1:1. Then, the processor 130 obtains a fifth reference point NR5 according to an intersection between a fourth extending line L4 passing through the first feature point NF1 (the nosewing endpoint of the nose NE1) and the fourth reference point NR4 (located at the middle of the first eye E1) and a fifth vertical line L5 of the third reference point NR3. The fifth reference point NR5 serves as the peak indication point of the eyebrow guide block. In this way, the processor 130 may acquire the eyebrow guide block according to the tip indication point (the second reference point NF2), the tail indication point (the first reference point NR1) and the peak indication point (the fifth reference point NR5).

Figure 6:
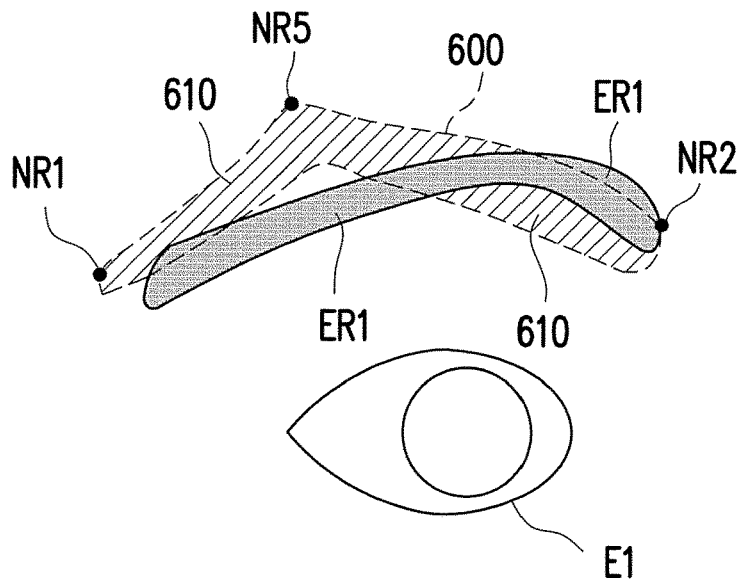
FIG. 6 is a schematic diagram of an eyebrow guide block according to an embodiment of the disclosure.

FIG. 6 is a schematic diagram of an eyebrow guide block according to an embodiment of the disclosure. In FIG. 6, the eye and the eyebrow of the right side face image of the user are enlarged to facilitate describing the present embodiment. Referring to FIG. 3 and FIG. 6, in the step S340, the processor 130 controls the display unit 120 to display the face image (for example, the right side face image 400) and the corresponding eyebrow guide block 600, and guides the user to put on makeup according to the eyebrow guide block 600. The eyebrow guide block 600 of FIG. 6 and the actual first eyebrow ER1 have a large difference due to description of the present embodiment, and the eyebrow guide block 600 is indicated by dash lines. In the present embodiment, the processor 130 of FIG. 1 may further compare the eyebrow guide block 600 and an actual eyebrow region ER1 (indicated by a solid line block) of the face image 400, and highlights a pending block (for example, a block 610) in the eyebrow guide block 600 that is not covered by the actual eyebrow region ER1. In this way, the user may learn that the pending block (the block 610) is required to be coated with color by using the eyebrow pencil, and the actual eyebrow region ER1 located outside the eyebrow guide block 600 is probably required to be shaved for shaping. Moreover, those skilled in the art may learn how to calculate and display the eyebrow guide block at the other half (the left side) face of the user according to the description of FIG. 3 to FIG. 6, for example, to calculate the eyebrow guide block of the left side according to positions of the nosewing, the eye and the eyebrow tip of the left side, which is not repeated. In the present embodiment, the eyebrow guide blocks of the left side and the right side of the face image can be simultaneously displayed on the display unit 120, the image capturing unit 110 of FIG. 2 may capture the face image of the user in real-time and may immediately calculate the eyebrow guide blocks of the left side and the right side, and the display unit 120 may display the face image and the corresponding eyebrow guide blocks in real-time.

The eyebrow shape guide method of the disclosure may adjust a pattern of the eyebrow guide block according to user's selection, for example, eyebrow shapes such as a "-"-shape eyebrow, a hill-shape eyebrow, a willow leaf-shape eyebrow, a bright eyes eyebrow, etc. Alternatively, the user may also select a color and a shape of the eyebrow through the display interface of the display unit 120 shown in FIG. 1, and preview the same through the display unit 120. In other exemplary embodiments, the processor 130 may also fine-tune the eyebrow guide block 600 according to the color and the shape selected by the user, and displays the same through the display unit 120.

In summary, the eyebrow shape guide device and the eyebrow shape guide method of the disclosure may calculate and display the eyebrow guide blocks according to positions of the nose, the eyes and the eyebrows in the face image of the user, such that the user learns a region of the eyebrow required to be shaped or emphasized, so as to accurately adjust the eyebrow shape. In this way, even the user is not familiar with makeup, the user may still shape the eyebrows or put on makeup on the eyebrows according to the prompt provided by the eyebrow shape guide device, so as to provide convenient interactive makeup teaching.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An eyebrow shape guide device, comprising:
a camera, capturing a face image of a user, wherein the face image at least comprises a nose portion, an eye portion and an eyebrow portion of the user;
a processor, receiving the face image, and acquiring at least one nose feature point, at least two eye feature points and at least one eyebrow feature point according to the face image, and performing calculation according to the at least one nose feature point, the at least two eye feature points and the at least one eyebrow feature point to obtain an eyebrow guide block,
wherein the face image comprises a first side face image and a second side face image, the first side face image comprises a first eye and a first eyebrow,
the at least one nose feature point comprises a first feature point corresponding to a nosewing close to the first eye, the at least two eye feature points comprises a second feature point corresponding to the first eye located the farthest away from one side of the nose, and the at least one eyebrow feature point comprises a third feature point corresponding to an eyebrow tip of the first eyebrow, wherein the at least two eye feature points further comprises a fourth feature point corresponding to the first eye located the closest to one side of the nose, wherein the processor configured to obtain a first reference point according to an intersection of a first extending line passing through the first feature point and the second feature point and a second horizontal line of the third feature point, and the first reference point serves as a tail indication point of the eyebrow guide block, obtain a second reference point according to an intersection of a third vertical line of the first feature point and the second horizontal line, and the second reference point serves as a tip indication point of the eyebrow guide block, obtain a third reference point from a line segment between the first reference point and the second reference point according to a predetermined proportion, obtain a fourth reference point located in the middle of the first eye according to the second feature point and the fourth feature point, and obtain a fifth reference point according to an intersection between a fourth extending line passing through the first feature point and the fourth reference point and a vertical line of the third reference point, wherein the fifth reference point serves as a peak indication point of the eyebrow guide block; and a display, displaying the face image and the corresponding eyebrow guide block, wherein the user puts on makeups according to the eyebrow guide block.

2. The eyebrow shape guide device as claimed in claim 1, wherein the predetermined proportion is a proportion of 1:2 between a distance between the first reference point and the third reference point and a distance between the second reference point and the third reference point, and
 a proportion between a distance between the second feature point and the fourth reference point and a distance between the fourth feature point and the fourth reference point is 1:1.

3. The eyebrow shape guide device as claimed in claim 1, wherein the processor compares the eyebrow guide block and a user eyebrow region of the face image, and highlights a pending block in the eyebrow guide block that is not covered by the user eyebrow region.

4. The eyebrow shape guide device as claimed in claim 1, wherein the camera captures the face image of the user in real-time, and calculates the eyebrow guide block immediately, and the display displays the face image and the corresponding eyebrow guide block in real-time.

5. An eyebrow shape guide method, comprising:
 capturing a face image of a user, wherein the face image at least comprises a nose portion, an eye portion and an eyebrow portion of the user;
 acquiring at least one nose feature point, at least two eye feature points and at least one eyebrow feature point according to the face image;
 performing calculation according to the at least one nose feature point, the at least two eye feature points and the at least one eyebrow feature point to obtain an eyebrow guide block, wherein the face image comprises a first side face image and a second side face image, the first side face image comprises a first eye and a first eyebrow, the at least one nose feature point comprises a first feature point corresponding to a nosewing close to the first eye, the at least two eye feature points comprises a second feature point corresponding to the first eye located the farthest away from one side of the nose, and the at least one eyebrow feature point comprises a third feature point corresponding to an eyebrow tip of the first eyebrow, wherein the at least two eye feature points further comprises a fourth feature point corresponding to the first eye located the closest to one side of the nose, and the step of performing calculation according to the at least one nose feature point, the at least two eye feature points and the at least one eyebrow feature point to obtain the eyebrow guide block comprises:

obtaining a first reference point according to an intersection of a first extending line passing through the first feature point and the second feature point and a second horizontal line of the third feature point, wherein the first reference point serves as a tail indication point of the eyebrow guide block;

obtaining a second reference point according to an intersection of a third vertical line of the first feature point and the second horizontal line, wherein the second reference point serves as a tip indication point of the eyebrow guide block, obtaining a third reference point from a line segment between the first reference point and the second reference point according to a predetermined proportion;

obtaining a fourth reference point located in the middle of the first eye according to the second feature point and the fourth feature point; and obtaining a fifth reference point according to an intersection between a fourth extending line passing through the first feature point and the fourth reference point and a vertical line of the third reference point, wherein the fifth reference point serves as a peak indication point of the eyebrow guide block; and displaying the face image and the corresponding eyebrow guide block to guide wherein the user puts on makeups according to the eyebrow guide block.

6. The eyebrow shape guide method as claimed in claim 5, wherein the predetermined proportion is a proportion of 1:2 between a distance between the first reference point and the third reference point and a distance between the second reference point and the third reference point, and
 a proportion between a distance between the second feature point and the fourth reference point and a distance between the fourth feature point and the fourth reference point is 1:1.

7. The eyebrow shape guide method as claimed in claim 5, further comprising:
 comparing the eyebrow guide block and a user eyebrow region of the face image, and highlighting a pending block in the eyebrow guide block that is not covered by the user eyebrow region.

* * * * *